(12) United States Patent
So et al.

(10) Patent No.: US 11,613,146 B2
(45) Date of Patent: Mar. 28, 2023

(54) CONTAINER STRUCTURE FOR ATTACHING SENSORS TO TIRES AND METHOD OF MANUFACTURING TIRE CONTAINER STRUCTURE

(71) Applicant: Hankook Tire Co., Ltd., Seoul (KR)

(72) Inventors: Soon Hong So, Daejeon (KR); Kwang Yong Lee, Daejeon (KR); Chang Hyo Hong, Daejeon (KR); Byung Lip Kim, Daejeon (KR); Jung Ho Son, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 640 days.

(21) Appl. No.: 16/204,749

(22) Filed: Nov. 29, 2018

(65) Prior Publication Data

US 2019/0160895 A1 May 30, 2019

(30) Foreign Application Priority Data

Nov. 30, 2017 (KR) ........................ 10-2017-0163738
Nov. 30, 2017 (KR) ........................ 10-2017-0163741

(51) Int. Cl.
*B60C 23/04* (2006.01)
*B29D 30/00* (2006.01)

(52) U.S. Cl.
CPC ...... *B60C 23/0493* (2013.01); *B29D 30/0061* (2013.01); *B29D 2030/0072* (2013.01); *B29D 2030/0077* (2013.01); *B29D 2030/0083* (2013.01)

(58) Field of Classification Search
CPC ........ B29D 2030/0083; B60C 23/0491; B60C 23/0493
See application file for complete search history.

(56) References Cited

U.S. PATENT DOCUMENTS

| 8,776,590 | B2 | 7/2014 | Kempf |
| 2014/0352420 | A1* | 12/2014 | Brusarosco ......... B60C 23/0493 73/146.5 |
| 2020/0031178 | A1* | 1/2020 | Ishii ........................ B60C 19/00 |
| 2020/0055354 | A1* | 2/2020 | Barjon ................ B60C 23/0493 |

FOREIGN PATENT DOCUMENTS

| JP | 4248893 B2 | 4/2009 |
| KR | 10-1999-0029976 A | 4/1999 |
| KR | 10-2000-0047579 A | 7/2000 |

(Continued)

*Primary Examiner* — Timothy Kennedy
*Assistant Examiner* — Olukorede Esan
(74) *Attorney, Agent, or Firm* — Bridgeway IP Law Group, PLLC; Jihun Kim

(57) ABSTRACT

Provided is a container structure for attaching sensors to tires and, more particularly, to a container structure for attaching sensors to tires, the container structure being able to prevent sensors attached to tires from being damaged by intense heat. The container structure can include: a bottom container that is attached to the inner liner of a tire; a top container that extends from the top of the bottom container and has an insertion space in which a sensor can be inserted; and a channel part that is formed on the inner side of the top container, in which the channel part is provided such that air can cool the sensor by flowing inside and outside with the sensor inserted in the top container.

10 Claims, 12 Drawing Sheets

(56) References Cited

FOREIGN PATENT DOCUMENTS

| KR | 10-0614520 B1 | 8/2006 |
| KR | 10-2017-0056322 A | 5/2017 |
| KR | 30-0913193 S | 7/2017 |
| KR | 10-1781697 B1 | 10/2017 |
| WO | 2011/021526 A1 | 1/2013 |

\* cited by examiner

| a step of preparing a vulcanized tire and a non-vulcanized container structure | — S210 |

| a step of putting a non-vulcanized container structure on the inner liner of a vulcanized tire and then vulcanizing the non-vulcanized container structure using a mold | — S220 |

CONTAINER STRUCTURE FOR ATTACHING SENSORS TO TIRES AND METHOD OF MANUFACTURING TIRE CONTAINER STRUCTURE

CROSS-REFERENCE TO RELATED APPLICATION

Pursuant to 35 U.S.C. § 119(a), this application claims the benefit of earlier filing date and right of priority to Korean patent application No. 10-2017-0163738 and No. 10-2017-0163741 filed on Nov. 30, 2017, the entire disclosures of which are hereby incorporated by reference.

BACKGROUND OF THE INVENTION

Field of the Invention

The present invention relates to a container structure for attaching sensors to tires and a method of manufacturing a tire integral type container structure, more particularly, to a container structure for attaching sensors to tires, the container structure being able to prevent sensors attached to tires from being damaged by intense heat.

Description of the Related Art

In general, when a sensor is attached to a tire, the sensor is inserted in a case and then the case is attached to the tire, so sensors are indirectly attached to tires.

The sensor inserted in the case is fixed therein by the structure of the case.

However, inner liners of tires are increased high in temperature around 100 degrees due to friction heat etc. during driving and cases attached to the inner liners are also increased high in temperature by heat transferred from the inner liners. Further, the internal temperature of the cases is increased higher than the temperature of the inner liners due to friction between the cases and the inner liners and between the cases and the sensors.

Accordingly, general sensors that are designed to normally operate at temperature of 120 degrees or lower may be broken due to high temperature.

In order to prevent this problem, a technology of integrating a case and a sensor has been developed in the related art. When a case and a sensor are integrated, as described above, friction heat is not generated between the case and the sensor, so breakdown of the sensor due to high temperature can be prevented.

However, when a case and a sensor are integrated, the sensor is damaged by shock applied to a tire or is broken by external factors, it is impossible to replace only the sensor and the entire device including the case has to be replaced, so it is not economical.

Further, an adhesive such as a cyan acrylic adhesive was used to attach the case of a sensor to an inner liner in the related art. However, in the case of attaching a case to an inner liner using an adhesive, as described above, the adhesive is aged and the adhesion surface is damaged when the temperatures of the inner liner and the case are increased over 140 degrees by high-speed rotation of a tire.

Accordingly, there is a need for a technology that allows for easy replacement of a sensor and can prevent breakdown of a sensor due to high temperature. Further, there is a need for a technology of preventing a sensor from separating from a tire even by an increase in temperature and shock applied to the tire.

CITATION LIST

Patent Literature

Patent Literature 1: U.S. Pat. No. 8,776,590
Patent Literature 2: Korean Patent No. 10-0614520

SUMMARY OF THE INVENTION

The present invention has been made in an effort to solve the above problem and an object of the present invention is to provide a container structure for attaching a sensor to a tire, the container structure being able to prevent breakdown of a sensor attached to a tire due to intense heat.

In order to solve these problems, an object of the present invention is to provide a method of manufacturing a tire integral type container structure, the method being able to integrate a container structure, which can prevent damage to a sensor on a tire due to high-temperature heat, with a tire.

The technical subjects to implement in the present invention are not limited to the technical problems described above and other technical subjects that are not stated herein will be clearly understood by those skilled in the art from the following specifications.

In order to achieve the objects, the present invention provides a container structure for attaching a sensor to a tire, the container structure including: a bottom container that is attached to the inner liner of a tire; a top container that extends from the top of the bottom container and has an insertion space in which a sensor can be inserted; and a channel part that is formed on the inner side of the top container, in which the channel part is provided such that air can cool the sensor by flowing inside and outside with the sensor inserted in the top container.

In an embodiment of the present invention, the bottom container may be formed in a disc shape and a polygonal shape to come in close contact with the inner liner.

In an embodiment of the present invention, the top container has the insertion space in which the sensor can be inserted and is formed in the shape of a cylinder or a polyprism with an open top.

In an embodiment of the present invention, the channel part may include: a plurality of entrances so that air flows inside and outside; and internal channels extending on the inner side of the top container such that the entrances are connected to each other.

In an embodiment of the present invention, the entrances and the internal channels are engraved on the inner side of the top container.

In an embodiment of the present invention, the entrances and the internal channels may be embossed on the inner side of the top container.

In an embodiment of the present invention, the channel part may further have a cooling hole formed through the bottom of the top container and the bottom container disposed at the corresponding position, and the cooling hole may be connected to the internal channels such that air flowing inside through the entrance cools the inner liner.

In order to achieve the objects, the present invention provides an electronic device formed by inserting a sensor in the container structure for attaching a sensor to a tire.

In order to achieve the objects, the present invention provides a tire to which an electronic device formed by inserting a sensor in the container structure for attaching a sensor to a tire of claim is attached.

In order to achieve the objects, the present invention provides a method of manufacturing a tire integral type container structure, the method including: a) preparing a vulcanized tire; and b) forming a container structure by injecting or compressing non-vulcanized rubber to an inner liner of the vulcanized tire.

In an embodiment of the present invention, the vulcanized rubber may be the same material as the inner liner or a crosslinkable-bonded elastomer composite to improve interface attachment between the inner liner and the container structure.

In an embodiment of the present invention, the method may further include pre-processing the vulcanized tire after the step a), in which in the pre-processing, the portion where the container structure is formed of the inner liner may be cleaned.

In an embodiment of the present invention, the pre-processing may be performed using a solvent including any one of naphtha, n-nucleic acid, toluene, and ethane with one or more or maximally four Cl substituted for H.

In an embodiment of the present invention, the pre-processing may be performed by any one or more of plasma surface processing, corona surface processing, and laser cleaning.

In an embodiment of the present invention, the step b) may form the container structure by injecting and compressing non-vulcanized rubber with an actual sensor placed in a mold having the shape of the container structure.

In an embodiment of the present invention, in the step b), the sensor may be coupled to a robot arm and then placed in a mold.

In an embodiment of the present invention, crosslinkable elastomer may generate crosslinking for 1 to 60 minutes.

In order to achieve the objects, the present invention provides a method of manufacturing a tire integral type container structure, the method including: a) preparing a vulcanized tire and a non-vulcanized container structure; and b) putting the non-vulcanized container structure on an inner liner of the vulcanized tire and then vulcanizing the non-vulcanized container structure using a mold, in which in the step a), a sensor mockup having an outer shape corresponding to the shape of an insertion space of the non-vulcanized container structure is disposed in the non-vulcanized container structure.

In an embodiment of the present invention, in the step a), the inside of the sensor mockup may be empty, and a first intake hole for receiving external air and a first exhaust hole for discharging the air in the sensor mockup may be formed at the upper portion of the sensor mockup.

In an embodiment of the present invention, in the step b), cooling air is injected into the first intake hole when the container is vulcanized.

In an embodiment of the present invention, in the step a), the sensor mockup may be filled with a metallic material and a cooling channel that maintains the outer shape of the sensor mockup by passing air is formed in the metallic material.

In an embodiment of the present invention, a second intake hole connected to the cooling channel to receive external air and a second exhaust hole for discharging air in the cooling channel may be formed at the upper portion of the sensor mockup.

In an embodiment of the present invention, in the step b), cooling air is injected into the second intake hole when the container is vulcanized.

In an embodiment of the present invention, in the step a), the sensor mockup may be made of thermosetting plastic.

In an embodiment of the present invention, the step b) may integrate the container structure with the inner liner of the tire by heating the container structure at 150 degrees or more for 3 or more minutes.

In an embodiment of the present invention, in the step b), the mold may include an upper mold and a lower mold, and the upper mold may be provided to vulcanize the container structure in close contact with the inner liner.

In an embodiment of the present invention, in the step b), the inner liner and the container structure may be vulcanized to be directly combined, and an interface measured by cross-sectional dimension analysis between the inner liner and the container structure may be 1 μm or less.

In order to achieve the objects, the present invention provides an intelligent tire including: a tire manufactured by the method of manufacturing a tire integral type container structure; and an electronic circuit that measures and keeps at least one of tire temperature, pressure, acceleration, strain, tire information, a tire ID, and a tire manufacturing history and can process and wirelessly transmit/receive the kept information.

In order to achieve the objects, the present invention provides an intelligent tire including: a tire manufactured by the method of manufacturing a tire integral type container structure; and an electronic circuit that measures and keeps at least one of tire temperature, pressure, acceleration, strain, tire information, a tire ID, and a tire manufacturing history and can process and wirelessly transmit/receive the kept information.

DETAILED DESCRIPTION OF THE PREFERRED EMBODIMENTS

Figure 1:
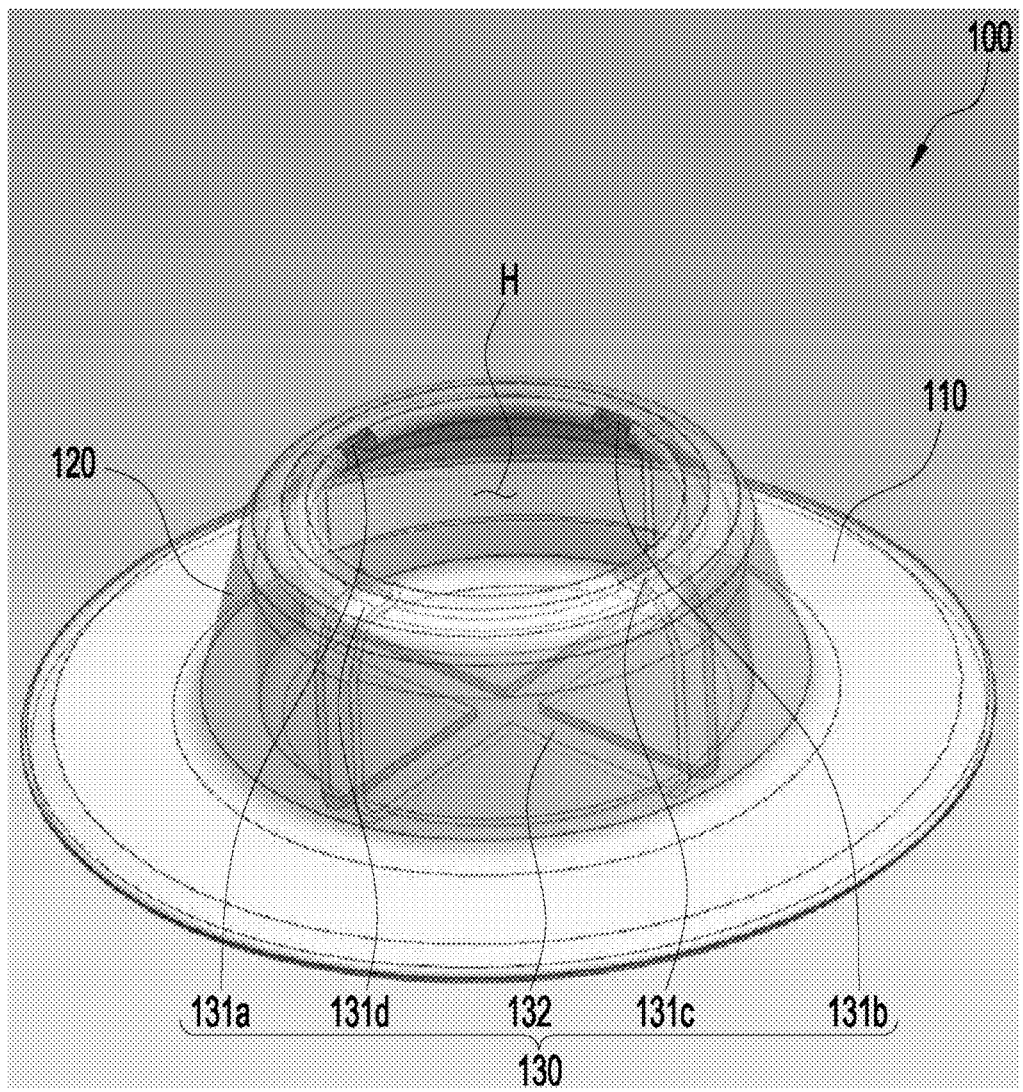
FIG. 1 is a projective perspective view showing the inside of a container structure for attaching a sensor to a tire according to an embodiment of the present invention.

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof. Hereinafter, embodiments of the present invention are described in detail with reference to the accompanying drawings.

Hereinafter, exemplary embodiments of the present invention will be described in detail with reference to the accompanying drawings.

Figure 2:
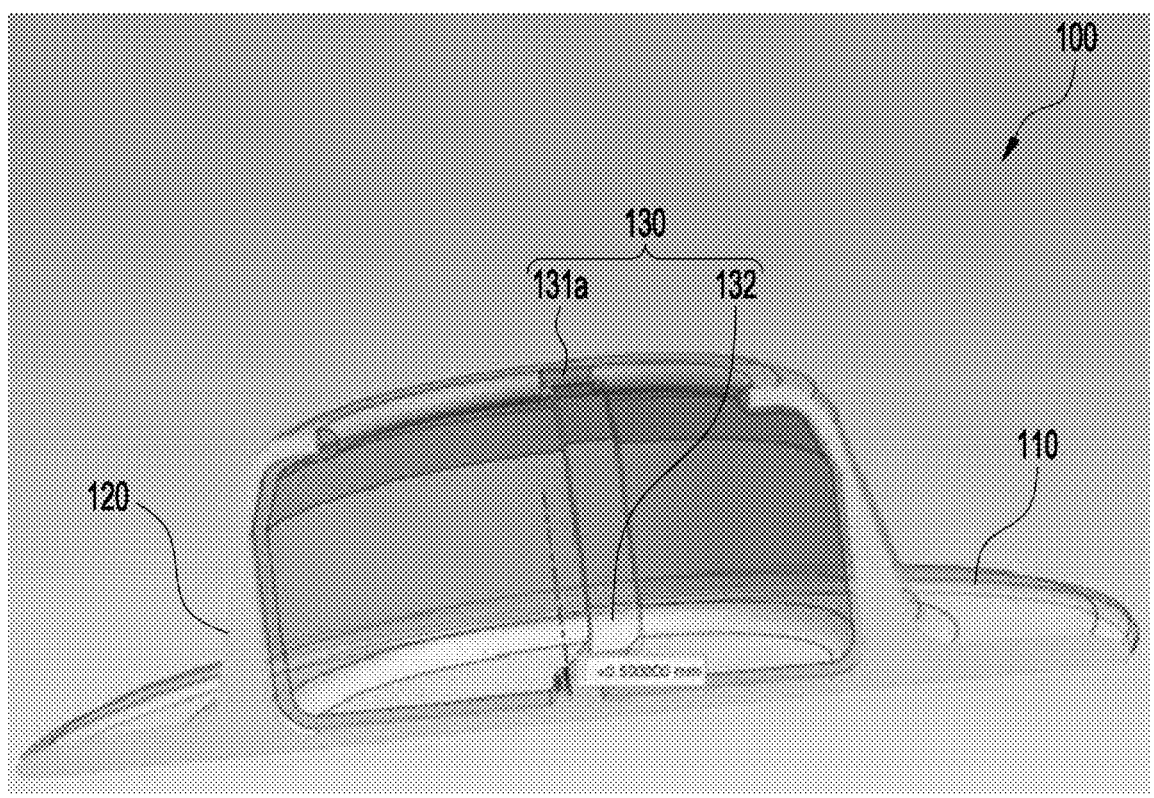
FIG. 2 is a vertical cross-sectional perspective view of the container structure for attaching a sensor to a tire according to an embodiment of the present invention.

FIG. 1 is a projective perspective view showing the inside of a container structure for attaching a sensor to a tire according to an embodiment of the present invention. FIG. 2 is a vertical cross-sectional perspective view of the container structure for attaching a sensor to a tire according to an embodiment of the present invention.

As shown in FIGS. 1 and 2, a container structure 100 for attaching a sensor to a tire according to an embodiment of the present invention includes a bottom container 110, a top container 120, and a channel part 130.

The bottom container 110 may be attached to the inner liner (not shown) of a tire.

The bottom container 110 may be formed in a disc shape and a polygonal shape to come in close contact with the inner liner, but is not limited to the shapes shown in the figures.

The top container 120 extends on the bottom container 110 and may have an insertion space H in which a sensor (not shown) can be inserted.

In detail, the top container 120 has the insertion space H in which the sensor can be inserted and may be formed in the shape of a cylinder or a polyprism with an open top.

The bottom container 110 and the top container 120 may be made of natural rubber, synthetic rubber, or a crosslinkable elastomer produced by mixing natural rubber and synthetic rubber. Alternatively, the bottom container 110 may be made of an elastomer and the top container 120 may be made of a polymer such as thermoplastic and thermosetting resin.

The channel part 130 is formed on the inner side of the top container 120 and includes an entrance 131 and internal channels 132. The channel part 130 may be provided so that air can cool a sensor (not shown) inserted in the top container 120 while flowing inside and outside.

The entrance 131 may be provided in plurality so that air flows inside and outside. In detail, the entrances 131 may be formed on the inner side of the upper portion of the top container 120 and may be circumferentially spaced apart from each other around the top container 120.

The entrances 131 are formed at the top of the top container 120, but they are not limited thereto and may be formed at the side of the top container 120. External air can flow into the internal channels 132 or the air in the internal channels 132 can flow outside through the entrances 131.

The internal channels 132 may extend on the inner side of the top container 120 such that the entrances 131 are connected to each other. In detail, the internal channels 132 may be formed such that the entrances 131 are connected to each other, and particularly, such that the internal channels 132 may pass through the center of the bottom of the top container 120. The internal channels 132 provided as described above can allow the air flowing inside through the entrances 131 cool the sensor by flowing around the sensor.

For example, as shown in FIG. 1, when four entrances 131 are formed at the top container 120, the air flowing inside through a first entrance 131a and a second entrance 131b can flow through the internal channels 132 and then can flow outside through a third entrance 131c and a fourth entrance 131d, thereby being able to cool the sensor.

However, the internal channels 132 are not limited to the shape of the embodiment and may extend circumferentially around the inner side of the top container 120. That is, the internal channels 132 may extend in a shape that can cool the sensor and each may be formed to connect a pair of entrances 131.

The entrances 131 and the internal channels 132 may be engraved or embossed on the inner side of the top container 120.

That is, although the entrances 131 and the internal channels 132 are illustrated as engraved on the top container 120 in FIGS. 1 and 2, they may be embossed by engraving out the other portions except for them.

The depth of the internal channels 132 may 10 to 70% of depth the top container 120, but may be preferably limited to 0.1 mm to maximally within 50% of the depth of the top container 120 in terms of durability.

The width of the internal channels 132 may be limited to 0.1 mm to within 40% of the circumference of the top container for smooth air circulation, but may be preferably 0.1 mm to 0.3 mm.

When the width of the internal channels 132 is less than 0.1 mm, air may not smoothly flow inside and outside. When the width of the internal channels 132 exceeds 0.3 mm, the flow speed of air circulating through the internal channels 132 decreases, so cooling may be slowed.

Figure 3:
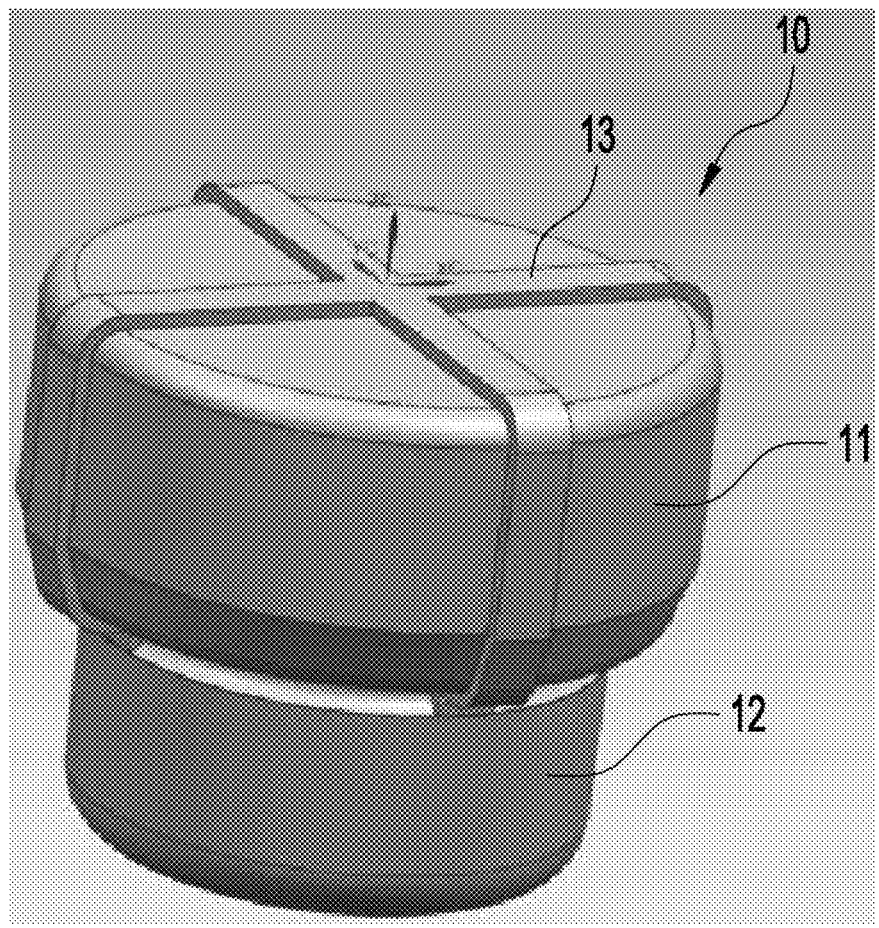
FIG. 3 is a perspective view showing a sensor mockup according to an embodiment of the present invention.
Figure 4:
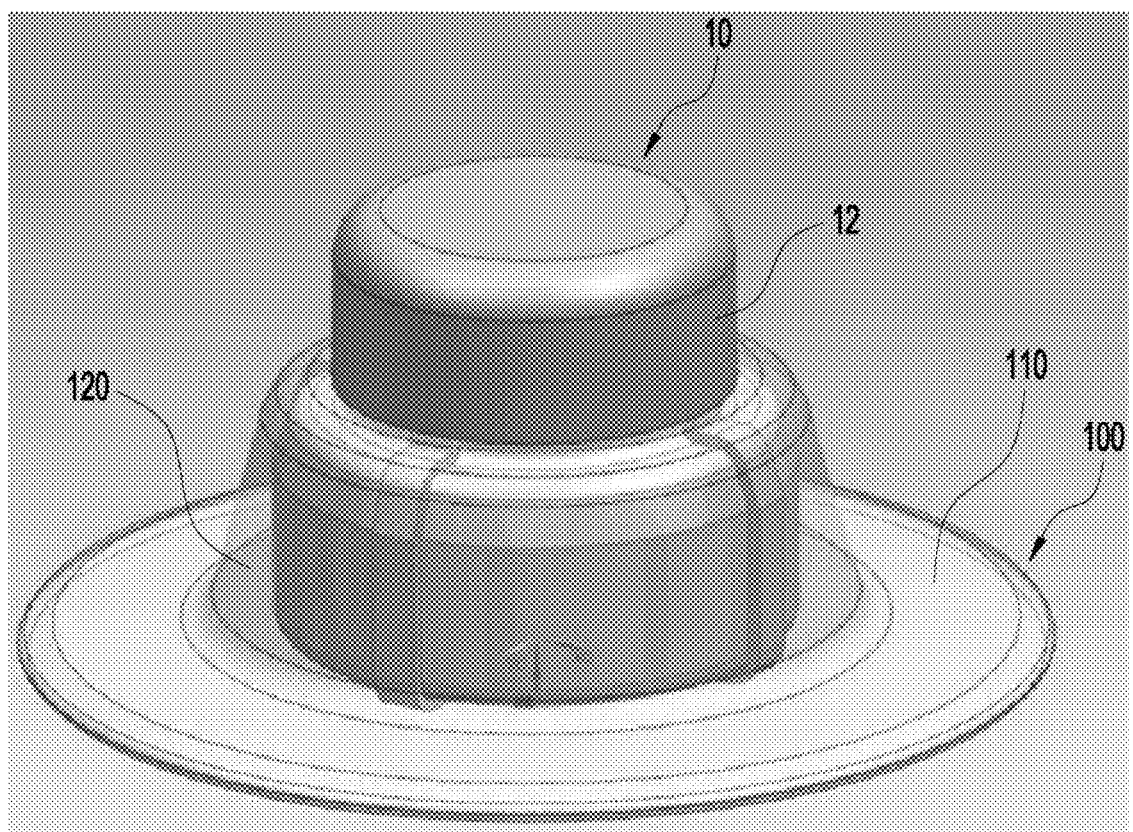
FIG. 4 is a perspective view showing an assembly of the sensor mockup and the container structure for attaching a sensor to a tire according to an embodiment of the present invention.

FIG. 3 is a perspective view showing a sensor mockup according to an embodiment of the present invention, and FIG. 4 is a perspective view showing an assembly of the sensor mockup and the container structure for attaching a sensor to a tire according to an embodiment of the present invention.

As shown in FIGS. 3 and 4, a sensor mockup 10 has an insertion body 11, an extension body 12, and a counter-channel part 13 and can be inserted in the container structure 100 for attaching a sensor to a tire to form the channel part 130 when the container structure 100 for attaching a sensor to a tire is formed.

The insertion body 11 is formed in a shape corresponding to the insertion space H in the top container 120 and can be inserted into the insertion space H of the top container 120.

The extension body 12 may extend in a predetermined direction from the insertion body 11.

The counter-channel part 13 may be formed on the outer side of the insertion body 11 and may be formed in a shape and at a position corresponding to those of the desired channel part 130.

The counter-channel part 13 may be embossed to engrave the channel part 120, or the counter-channel part 13 may be engraved to emboss the channel part 130.

Figure 5:
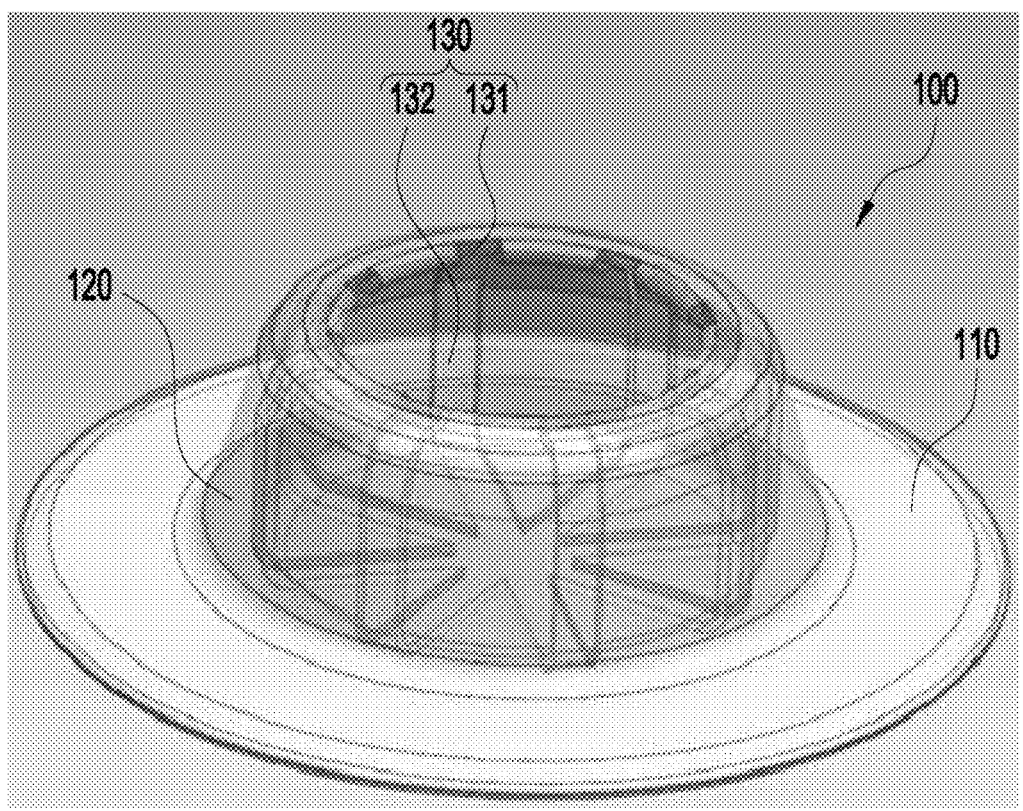
FIG. 5 is a perspective view of the container structure for attaching a sensor to a tire according to an embodiment of the present invention.

FIG. 5 is a perspective view of the container structure for attaching a sensor to a tire according to an embodiment of the present invention.

Although the entrances 131 are limited to four in FIGS. 1 and 2, the internal channels 130 of the container structure 100 for attaching a sensor to a tire is not limited to four and may include all cases having a plurality of entrances, as shown in FIG. 5.

Figure 6:
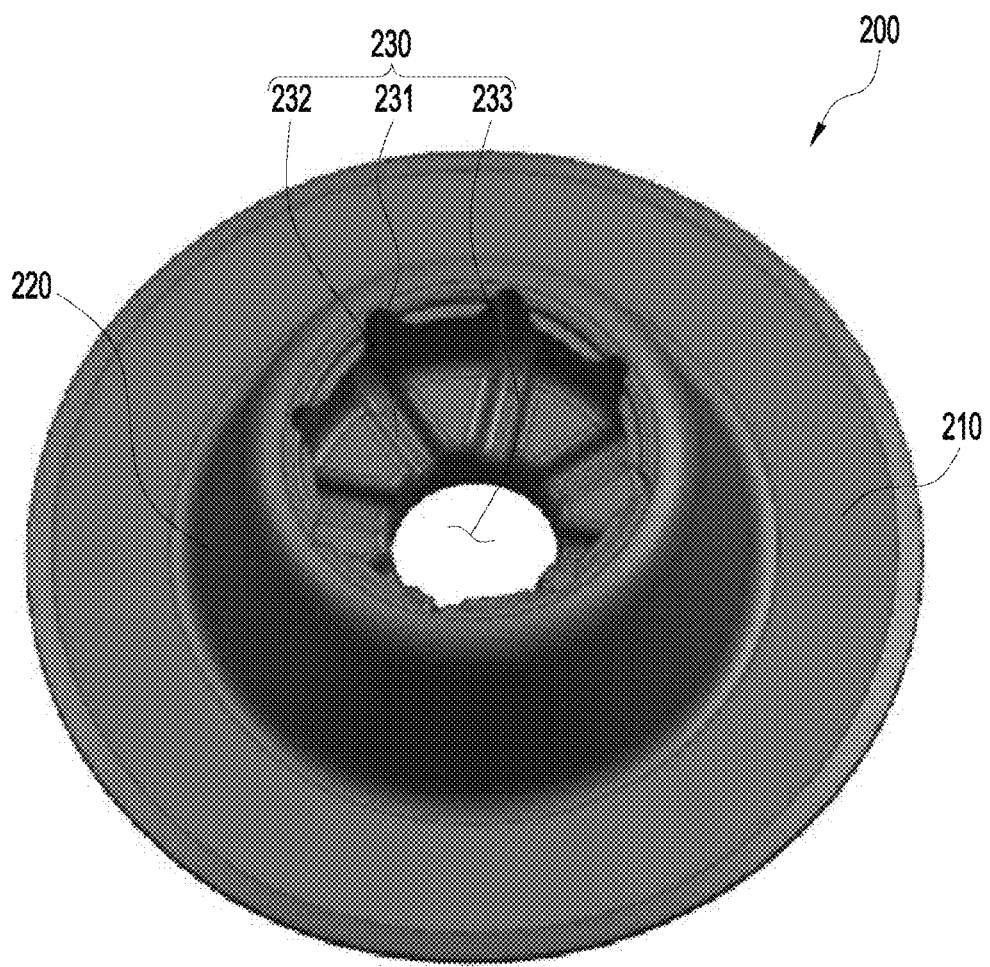
FIG. 6 is a perspective view of a container structure for attaching a sensor to a tire according to another embodiment of the present invention.
Figure 7:
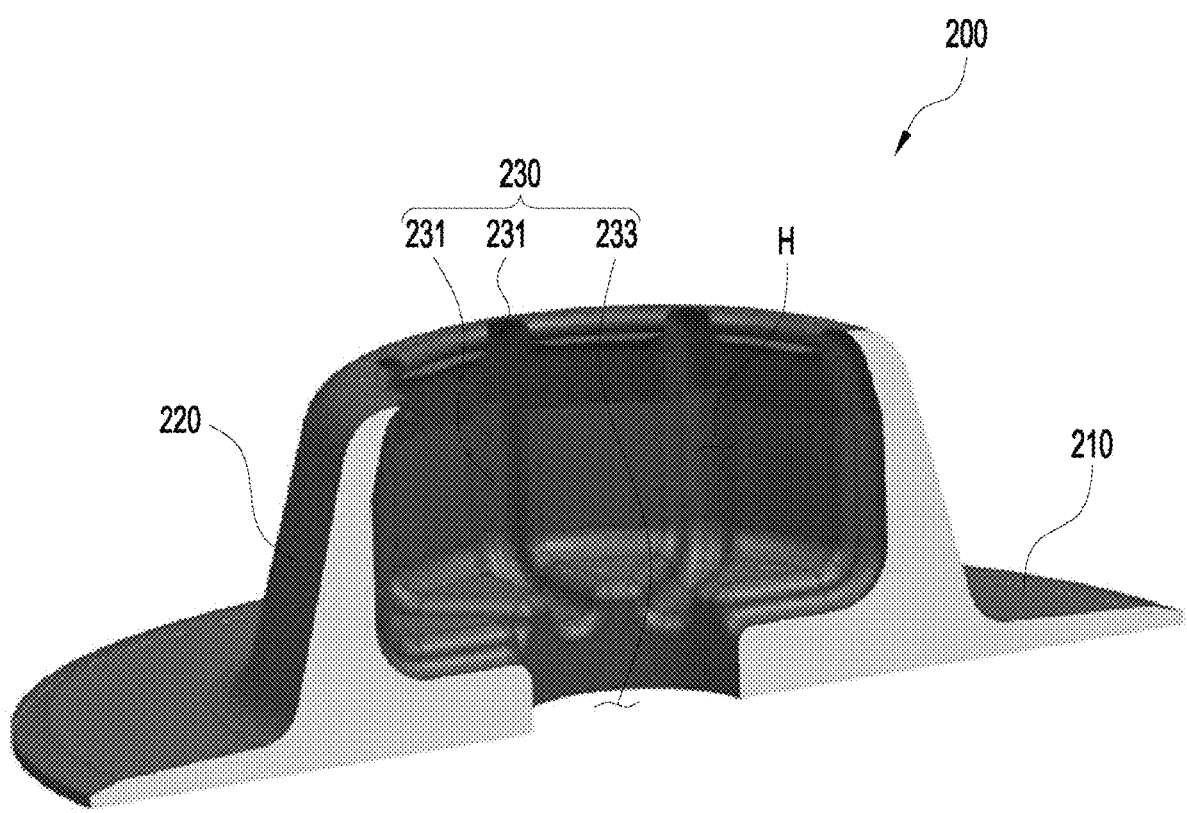
FIG. 7 is a vertical cross-sectional perspective view of the container structure for attaching a sensor to a tire according to another embodiment of the present invention.

FIG. 6 is a perspective view of a container structure for attaching a sensor to a tire according to another embodiment of the present invention, and FIG. 7 is a vertical cross-sectional perspective view of the container structure for attaching a sensor to a tire according to another embodiment of the present invention.

As shown in FIGS. 6 and 7, a container structure 200 for attaching a sensor to a tire according to another embodiment of the present invention includes a bottom container 210, a top container 220, and a channel part 230.

The bottom container 210 can be attached to the inner liner (not shown) of a tire.

The bottom container 210 may be formed in a disc shape and a polygonal shape to come in close contact with the inner liner, but is not limited to the shapes shown in the figures.

The top container 220 extends on the bottom container 210 and may have an insertion space H in which a sensor (not shown) can be inserted.

In detail, the top container 220 has the insertion space H in which the sensor can be inserted and may be formed in the shape of a cylinder or a polyprism with an open top.

The channel part 230 is formed on the inner side of the top container 220 and includes an entrance 231, internal channels 232, and a cooling hole 233. The channel part 230 is provided so that when a sensor (not shown) is inserted in the top container 220, air can cool the sensor while flowing inside and outside.

The entrances 231 may be provided in plurality so that air flows inside and outside. In detail, the entrances 231 may be formed on the inner side of the upper portion of the top container 220 and may be circumferentially spaced apart from each other around the top container 220.

The entrances 231 are formed at the upper portion of the top container 220, but it is not limited thereto and may be formed at the side of the top container 220. External air can flow into the internal channels 232 or the air in the internal channels 232 can flow outside through the entrance 231.

The depth and width of the internal channels 232 are the same as those in the container structure 100 for attaching a sensor to a tire according to the previous embodiment.

The cooling hole 233 may be formed through the bottom of the top container 220 and the bottom container 210 disposed at the corresponding position.

The cooling hole 233 may be provided to be connected to the internal channels 232, so air flowing inside through the entrance 231 can cool the inner liner by flowing through the cooling hole 233.

The diameter of the cooling hole 233 may be 2 mm to 90% of the diameter of the sensor.

According to the container structures 100 and 200 according to an embodiment and another embodiment of the present invention, when a sensor breaks, the sensor can be easily replaced and the container structures 100 and 200 can keep being used, so it is economical.

Further, since the container structures 100 and 200 have the channel parts 130 and 230 that can reduce the temperature of a sensor and an inner liner, it is possible to effectively prevent breakage of the sensor due to high temperature.

An electronic device can be formed by inserting a sensor in the container structures 100 and 200 for attaching a sensor to a tire provided as described above. Further, the electronic device can be attached to a tire.

Figure 8:
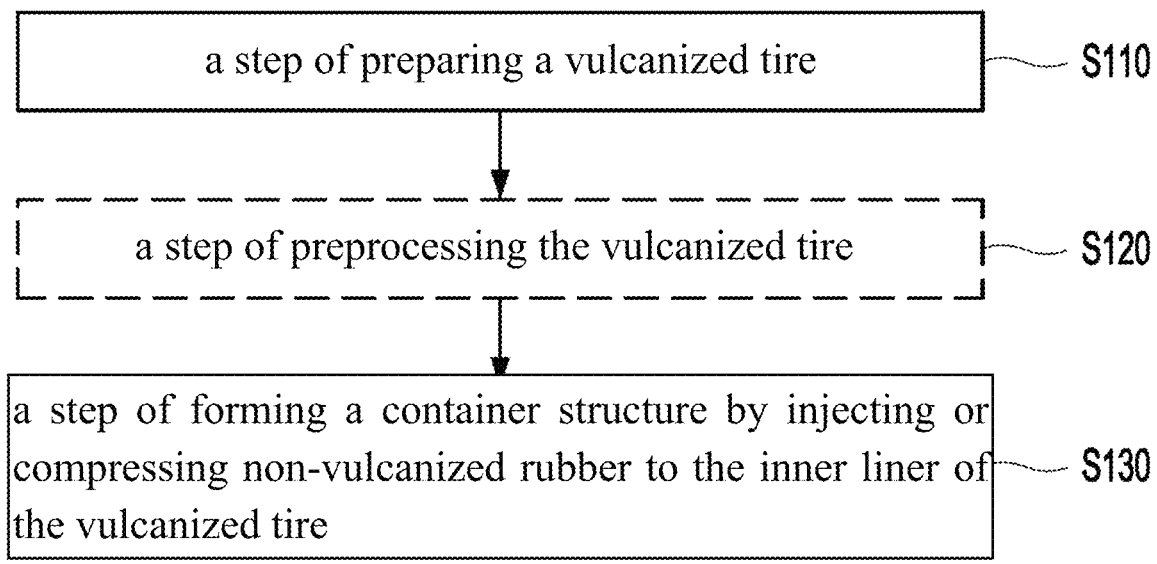
FIG. 8 is a flowchart showing a method of manufacturing a tire-integrated container structure according to an embodiment of the present invention.
Figure 9:
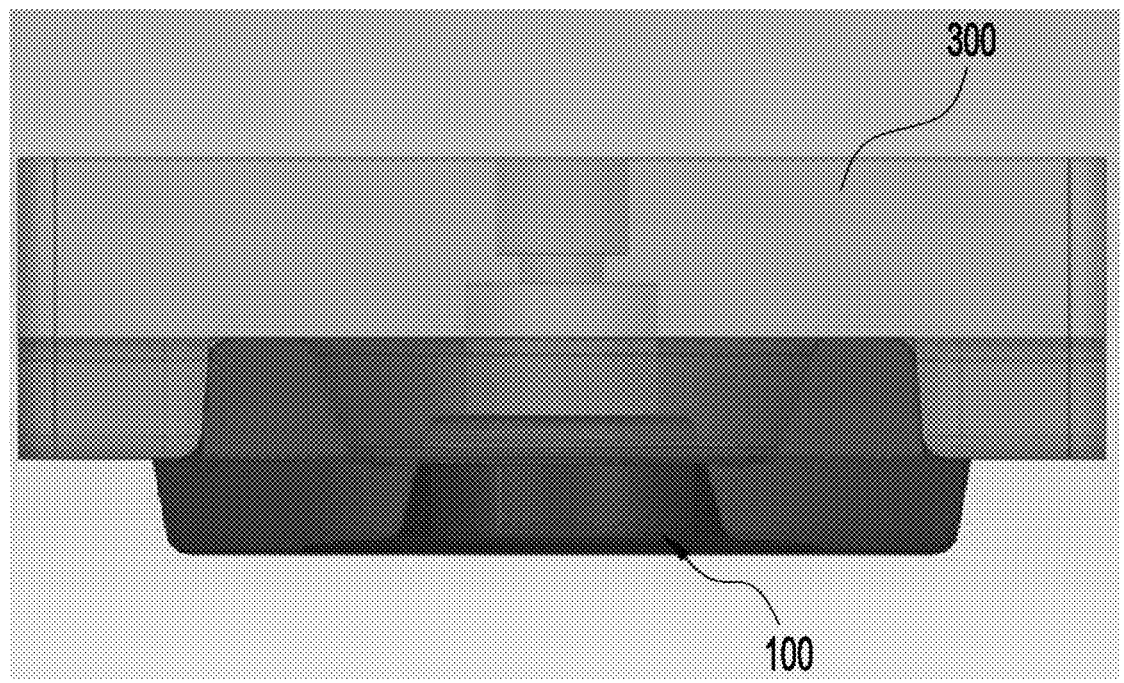
FIG. 9 is an injection machine according to an embodiment of the present invention.
Figures 10, 11:
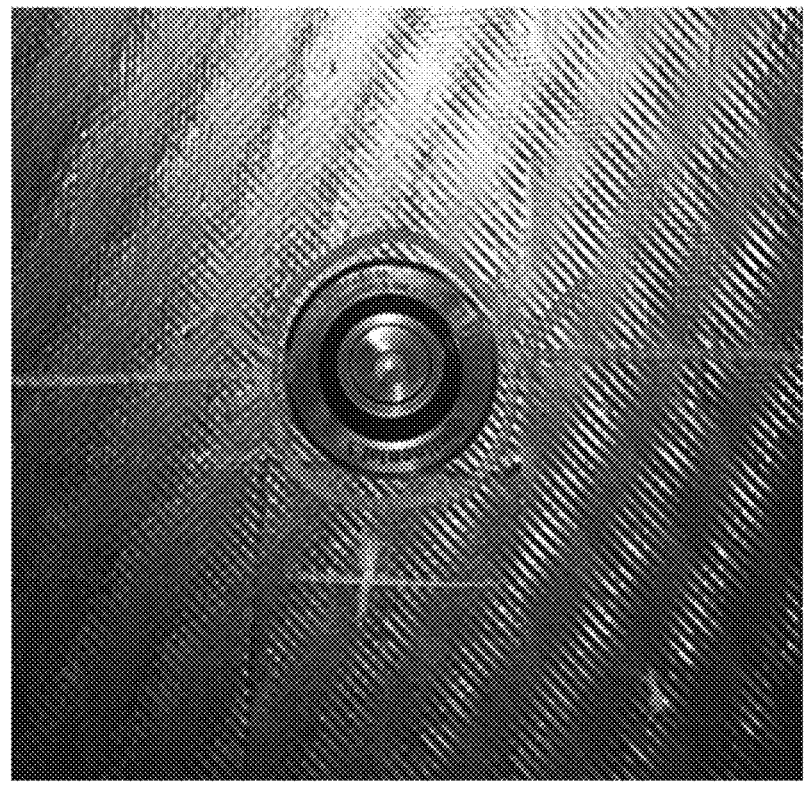
FIG. 10 is a picture of a tire-integrated container structure according to an embodiment of the present invention.
FIG. 11 is a flowchart showing a method of manufacturing the tire-integrated container structure according to another embodiment of the present invention.

FIG. 8 is a flowchart showing a method of manufacturing a tire-integrated container structure according to an embodiment of the present invention, FIG. 9 is an injection machine according to an embodiment of the present invention, and FIG. 10 is a picture of a tire-integrated container structure according to an embodiment of the present invention.

As shown in FIGS. 8 to 10, a method of manufacturing a tire-integrated container structure according to an embodiment can perform a step of preparing a vulcanized tire (S110).

The method may further include a step of preprocessing the vulcanized tire (S120) after the step of preparing a vulcanized tire (S110).

The step of preprocessing the vulcanized tire (S120) may be characterized by cleaning the portion where the container structure 100 will be formed of the inner liner. In detail, the step of preprocessing the vulcanized tire (S120) can perform preprocessing by cleaning the portion to which the container structure 100 will be attached, using a liquid-state cleaner or using laser cleaning or plasma cleaning.

Further, the step of preprocessing the vulcanized tire (S120) includes preprocessing a tire using a solvent including any one of naphtha, n-hexane, toluene, and ethane with one or more or maximally four Cl substituted for H.

After the step of preprocessing the vulcanized tire (S120), a step of forming a container structure by injecting or compressing non-vulcanized rubber to the inner liner of the vulcanized tire (S130) may be performed.

The non-vulcanized rubber includes all rubber that is used for manufacturing tires such as natural rubber, synthetic rubber, and synthetic rubber of natural rubber and synthetic rubber. Further, preferably, the non-vulcanized rubber may be the same material as the inner liner or a crosslinkable-bonded elastormer composition to improve interface attachment between the inner liner and the container structure 100.

In the step of forming a container structure by injecting and compressing non-vulcanized rubber to the inner liner of a vulcanized tire (S130), the non-vulcanized rubber can be injected and compressed by any one of a C-type press, a robot arm, or an injection machine 300.

When the container structure 100 is formed on the inner liner by injecting the non-vulcanized rubber, it is possible to integrate the container structure 100 with the inner liner of a tire by injecting and forming the non-vulcanized rubber at temperature of 100 degrees or higher.

The crosslinkable elastormer not vulcanized yet may be provided such that crosslinking occurs for 1 to 60 minutes.

In the step of forming a container structure by injecting and compressing non-vulcanized rubber to the inner liner of a vulcanized tire (S130), the container structure 100 may be formed by injecting and compressing non-vulcanized rubber with an actual sensor placed in a mold having the shape of the container structure 100.

Further, in the step of forming a container structure by injecting and compressing non-vulcanized rubber to the inner liner of a vulcanized tire (S130), the sensor may be coupled to a robot arm and then placed in a mold having the shape of the container structure 100.

The sensor may be a smart intelligent sensor that can wirelessly transmit and receive, and measure data.

Figure 12:
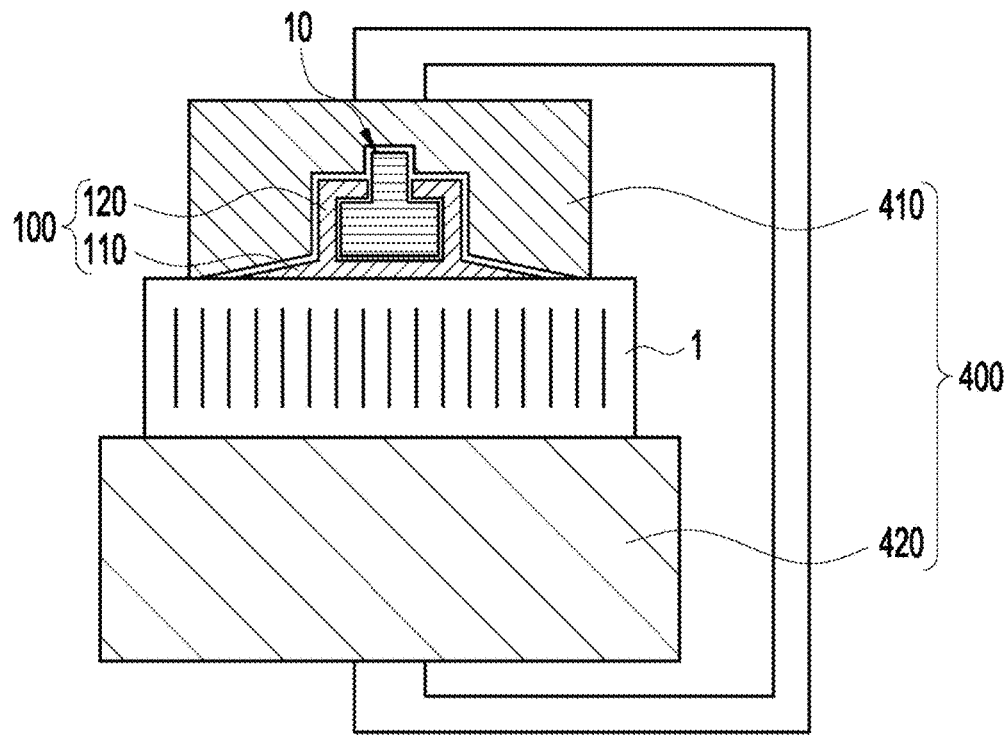
FIG. 12 is an exemplary view showing the processes of a method of manufacturing the tire-integrated container structure according to another embodiment of the present invention.
Figure 13:
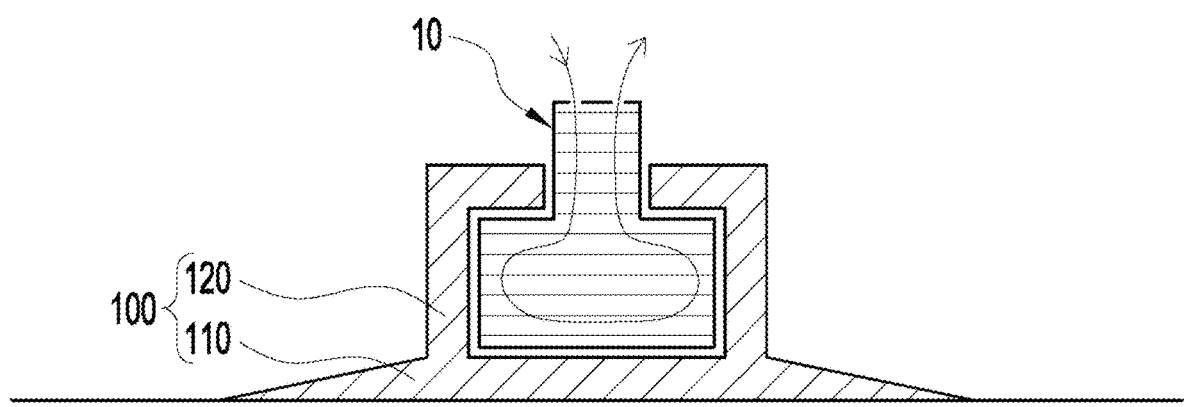
FIG. 13 is an exemplary view showing airflow in a sensor mockup according to another embodiment of the present invention.

FIG. 11 is a flowchart showing a method of manufacturing the tire-integrated container structure according to another embodiment of the present invention, FIG. 12 is an exemplary view showing the processes of a method of manufacturing the tire-integrated container structure according to another embodiment of the present invention, and FIG. 13 is an exemplary view showing airflow in a sensor mockup according to another embodiment of the present invention.

As shown in FIGS. 11 to 13, a method of manufacturing a tire-integrated container structure according to another embodiment can perform a step of preparing a vulcanized tire and a non-vulcanized container structure (S210).

In the step of preparing a vulcanized tire and a non-vulcanized container structure (S210), the sensor mockup 10 having an outer shape corresponding to the shape of an insertion space H (see FIG. 1) of the non-vulcanized container structure 100 may be disposed in the non-vulcanized container structure 100.

The sensor mockup 10 may be made of thermosetting plastic, but it is not limited thereto and may be made of heat-resistant plastic or metal having a high melting point not to be melted by heat during vulcanizing process.

Figure 14:
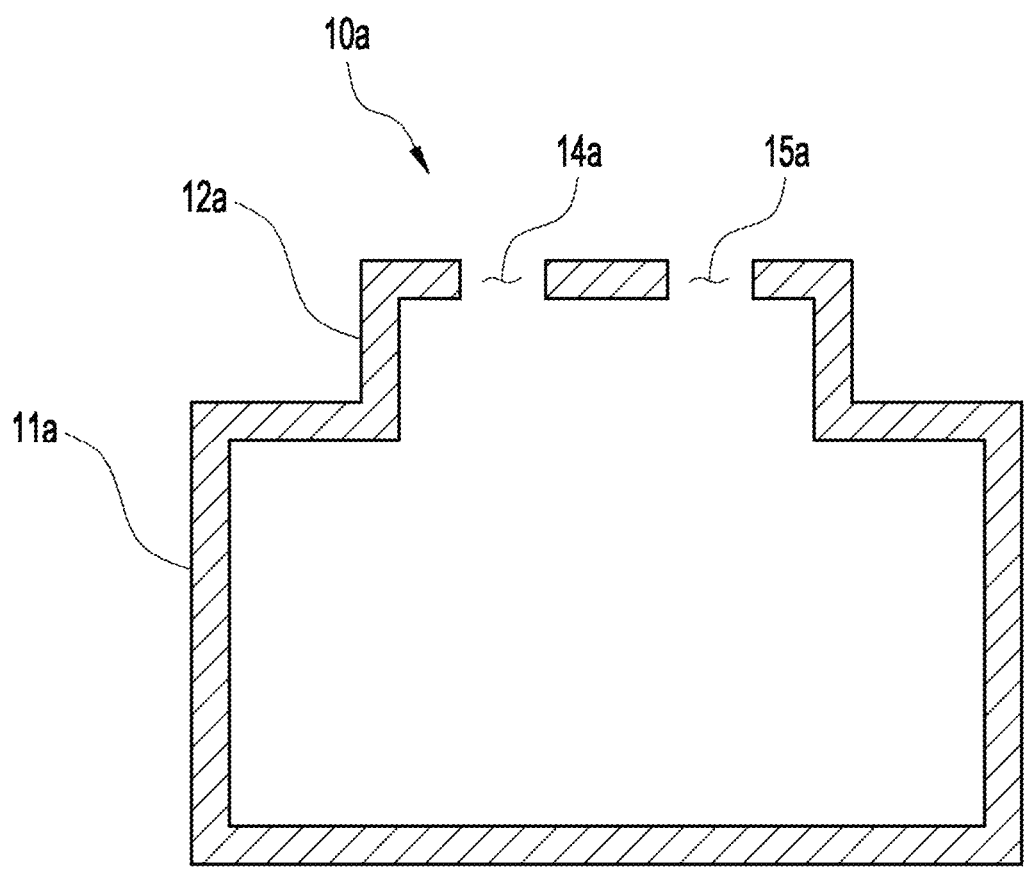
FIG. 14 is an exemplary cross-sectional view of a sensor mockup with an empty inside according to another embodiment of the present invention.

FIG. 14 is an exemplary cross-sectional view of a sensor mockup with an empty inside according to another embodiment of the present invention.

In the step of preparing a vulcanized tire and a non-vulcanized container structure (S210), the inside of the sensor mockup 10a is empty, and a first intake hole 14a for receiving external air and a first exhaust hole 15a for discharging the air in the sensor mockup 10a may be formed at the upper portion of the sensor mockup 10a.

The first intake hole 14a and the first exhaust hole 15a may enable the sensor mockup 10a to maintain the external shape even during vulcanizing.

In detail, the non-vulcanized container structure 100 may be deformed by heat and pressure during vulcanizing. Accordingly, the container structure 100 can be vulcanized with the sensor mockup 10a inserted in the container structure 100 to prevent deformation of the container structure 100.

The sensor mockup 10a is disposed in the container structure 100, but it may be deformed by heat during vulcanizing. Accordingly, the first intake hole 14a and the first exhaust hole 15a are formed at the upper portion of the sensor mockup 10a, a space is formed in the sensor mockup 10a, and then external air is introduced into the internal space through the first intake hole 14a, whereby the sensor mockup 10a can be cooled. Further, the first exhaust hole 15a allows the air that has increased in temperature in the internal space of the sensor mockup 10a to be discharged outside such that cooling air flows into the sensor mockup 10a and high-temperature air is discharged, whereby air can be continuously circulated.

The sensor mockup 10a, as described above, may enable the container structure 100 to be vulcanized while maintaining a predetermined shape and may allow the channel part 130 to be formed in the container structure 100.

Further, the sensor mockup 10a may not be integrated with the container structure 100 during vulcanizing. Accordingly, after vulcanizing is finished, it is easy to remove the sensor mockup 10a and then insert a sensor to be actually mounted into the container structure 100.

Figure 15:
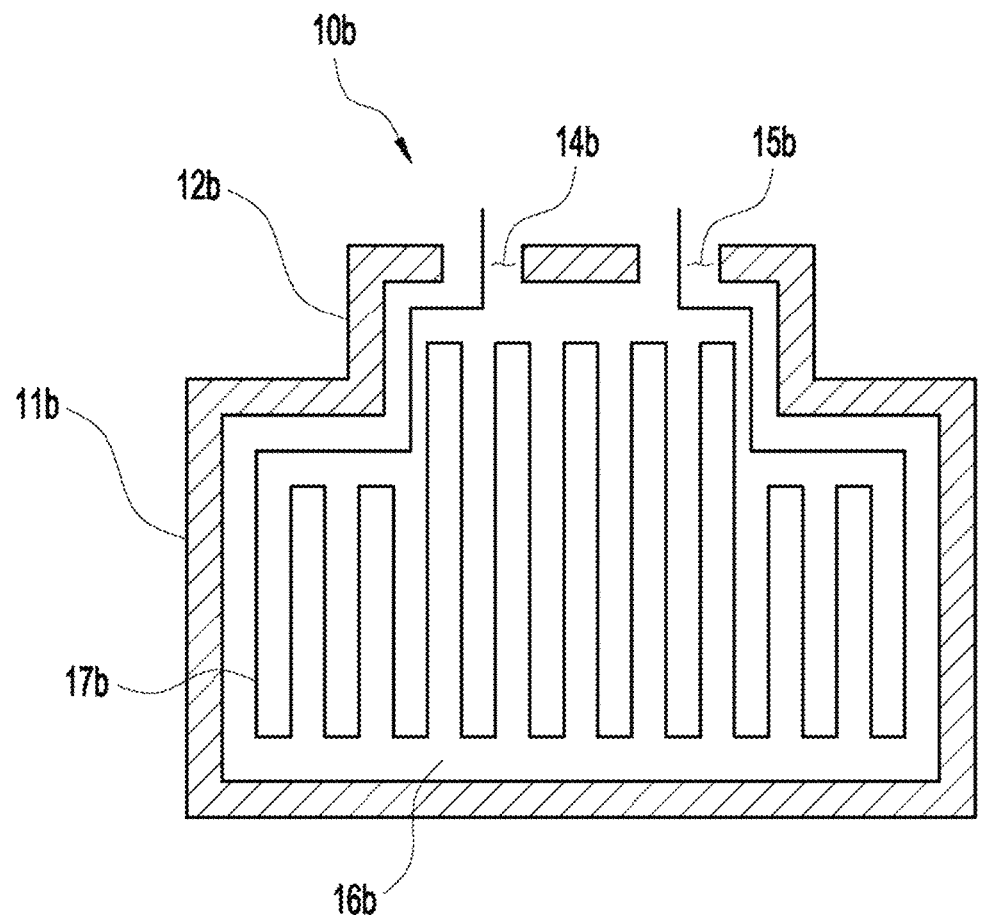
FIG. 15 is an exemplary cross-sectional view of a sensor mockup with a cooling channel formed therein according to another embodiment of the present invention.

FIG. 15 is an exemplary cross-sectional view of a sensor mockup with a cooling channel therein according to another embodiment of the present invention.

In the step of preparing a vulcanized tire and a non-vulcanized container structure (S210), the sensor mockup 10b is filled with a metallic material 16b and a cooling channel 17b that maintains the outer shape of the sensor mockup 10b by passing air may be formed in the metallic material 16b.

A second intake hole 14b connected to the cooling channel 17b to receive external air and a second exhaust hole 15b for discharging the air in the cooling channel 17b may be formed at the upper portion of the sensor mockup 10b.

The second intake hole 14b and the second exhaust hole 15b may enable the sensor mockup 10b to maintain the external shape even during vulcanizing.

In detail, the non-vulcanized container structure 100 may be deformed by heat and pressure during vulcanizing. Accordingly, the container structure 100 may be vulcanized with the sensor mockup 10b inserted in the container structure 100 to prevent deformation of the container structure 100.

The sensor mockup 10b is disposed in the container structure 100, but it may be deformed by heat during vulcanizing. Accordingly, the second intake hole 14b and the second exhaust hole 15b are formed at the upper portion of the sensor mockup 10b, a space is formed in the sensor mockup 10b, and then external air is introduced into the cooling channel 17b through the second intake hole 14b, whereby the sensor mockup 10b can be cooled. The second exhaust hole 15b allows air that has increased in temperature in the cooling channel 17b of the sensor mockup 10b to be discharged outside such that cooling air flows into the cooling channel 17b of the sensor mockup 10b and high-temperature air is discharged outside the cooling channel 17b, whereby air can continuously circulate.

The sensor mockup 10b, as described above, may enable the container structure 100 to be vulcanized while maintaining a predetermined shape and may allow the channel part 130 to be formed in the container structure 100.

Further, the sensor mockup 10b may not be integrated with the container structure 100 during vulcanizing. Accordingly, after vulcanizing is finished, it is easy to remove the sensor mockup 10b and then insert a sensor to be actually mounted into the container structure 100.

Referring back to FIGS. 11 to 13, after the step of preparing a vulcanized tire and a non-vulcanized container structure (S210), a step of putting a non-vulcanized container structure on the inner liner of a vulcanized tire and then vulcanizing the non-vulcanized container structure using a mold (S220) can be performed.

The step of putting a non-vulcanized container structure on the inner liner of a vulcanized tire and then vulcanizing the non-vulcanized container structure using a mold (S220) may be performed using a C-type press 400.

The press 400 may include an upper mold 410 and a lower mold 420.

The upper mold 410 has a space having a shape corresponding to the outer shape of the container structure 100 at the lower portion therein and may be positioned on the inner liner of a tire 1.

The lower mold 420 may be positioned to face the upper mold 410 with the tire 1 therebetween.

Using the press 400, it is possible to integrate the container structure 100 and the tire 1 by putting the container structure 100 on the inner liner of the tire 1 and then applying heat and pressure to the container structure 100.

The step of putting a non-vulcanized container structure on the inner liner of a vulcanize tire and then vulcanizing the non-vulcanized container structure using a mold (S220) may be characterized by integrating the container structure 100 with the inner liner of the tire by heating the container structure at 150 degrees or higher for 3 minutes or longer.

Further, only a gas phase exists on the interface between the inner liner of the tire 1 and the container structure 100, and according to cross-sectional dimension analysis using a microscope, the gap of the interface may be 1 μm or less.

According to the present invention, it is possible to easily replace a sensor and keep using the container structure when the sensor inserted in the container structure breaks, so it is economical.

Further, since a channel part that can decrease the temperature of a sensor and an inner liner is formed in the container structure, it is possible to effectively prevent breakdown of the sensor due to high temperature.

Further, since the container structure and a tire are integrated, the tire is not increased in temperature to a high level or the container is not separated from the tire even if shock is applied to the tire, so the structure is stable.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as a single part may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A container structure for attaching a sensor to a tire, the container structure comprising:
  a bottom container configured to be attached to an inner liner of the tire;
  a top container extending from a top of the bottom container and having an insertion space in which the sensor is to be disposed; and
  a channel part formed on an inner surface of the top container,
  wherein the channel part includes:
  a plurality of entrances formed on an inner side of an upper end portion of the top container, each entrance being formed to be recessed from an inner circumference of the upper end portion of the top container; and
  a plurality of internal channels extending from the plurality of entrances along an inner lateral surface and an inner base surface of the top container to connect the plurality of entrances to each other,
  wherein at least two of the plurality of internal channels intersects each other on the bottom of the top container, and
  wherein the plurality of internal channels are recessed on the inner lateral surface and the inner base surface of the top container.

2. The container structure of claim 1, wherein the bottom container is formed in a disc shape or a polygonal shape.

3. The container structure of claim 1, wherein the top container has an open top.

4. The container structure of claim 1, wherein the channel part further includes a cooling hole formed through the bottom of the top container and the bottom container, and
  wherein the cooling hole is connected to the plurality of internal channels such that air flowing inside the container structure through the plurality of entrances cools the inner liner.

5. A method of manufacturing a container structure, the method comprising:
  a) preparing a vulcanized tire; and
  b) forming a container structure by injecting or compressing non-vulcanized rubber to an inner liner of the vulcanized tire,
  wherein in the step b), the container structure includes:
  a bottom container configured to be attached to the inner liner of the vulcanized tire;
  a top container extending from a top of the bottom container and having an insertion space in which a sensor is to be disposed; and
  a channel part formed on an inner surface of the top container,
  wherein the channel part includes:
  a plurality of entrances formed on an inner side of an upper end portion of the top container, each entrance being formed to be recessed from an inner circumference of the upper end portion of the top container;
  a plurality of internal channels extending from the plurality of entrances along an inner lateral surface and an inner base surface of the top container to connect the plurality of entrances to each other; and
  a cooling hole formed through the bottom of the top container and the bottom container, and
  wherein the cooling hole is connected to the plurality of internal channels such that air flowing inside the container structure through the plurality of entrances cools the inner liner, and
  wherein the plurality of internal channels are recessed on the inner lateral surface and the inner base surface of the top container.

6. The method of claim 5, wherein the non-vulcanized rubber is a material applied in the inner liner or is a crosslinkable-bonded elastomer composite to improve interface attachment between the inner liner and the container structure.

7. The method of claim 5, further comprising pre-processing the vulcanized tire after the step a), wherein in the pre-processing, a portion where the container structure is formed on the inner liner is cleaned.

8. The method of claim 7, wherein the pre-processing is performed using a solvent including any one of naphtha, n-nucleic acid, toluene, and ethane with one or more or maximally four Cl substituted for H.

9. The method of claim 7, wherein the pre-processing is performed by at least one of plasma surface processing, corona surface processing, and laser cleaning.

10. The method of claim 5, wherein in the step b), the container structure is formed by injecting and compressing the non-vulcanized rubber with the sensor placed in a mold having a shape of the container structure.

* * * * *